United States Patent
Xia et al.

(10) Patent No.: US 12,501,347 B2
(45) Date of Patent: Dec. 16, 2025

(54) SIGNAL TRANSMISSION METHODS AND APPARATUSES, NODES, AND STORAGE MEDIA

(71) Applicant: ZTE CORPORATION, Shenzhen (CN)

(72) Inventors: Shuqiang Xia, Shenzhen (CN); Feng Xie, Shenzhen (CN); Yijian Chen, Shenzhen (CN); Bo Dai, Shenzhen (CN); Guanghui Yu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 404 days.

(21) Appl. No.: 18/016,642

(22) PCT Filed: Jul. 8, 2021

(86) PCT No.: PCT/CN2021/105265
§ 371 (c)(1),
(2) Date: Jan. 17, 2023

(87) PCT Pub. No.: WO2022/012411
PCT Pub. Date: Jan. 20, 2022

(65) Prior Publication Data
US 2023/0300892 A1    Sep. 21, 2023

(30) Foreign Application Priority Data
Jul. 16, 2020    (CN) .......................... 202010687624.0

(51) Int. Cl.
*H04W 74/08* (2024.01)
*H04W 48/08* (2009.01)
*H04W 74/0833* (2024.01)

(52) U.S. Cl.
CPC ....... *H04W 48/08* (2013.01); *H04W 74/0833* (2013.01)

(58) Field of Classification Search
CPC ......... H04W 74/0833; H04W 74/0836; H04W 74/0838; H04W 74/08; H04W 74/0808;
(Continued)

(56) References Cited

U.S. PATENT DOCUMENTS

2018/0063801 A1* 3/2018 Lu ..................... H04W 74/0833
2019/0132882 A1* 5/2019 Li ....................... H04L 27/2605
(Continued)

FOREIGN PATENT DOCUMENTS

| CA | 3118244 C | 6/2024 |
| CN | 107733829 A | 2/2018 |

(Continued)

OTHER PUBLICATIONS

Chinese Notification of the First Office Action dated Aug. 8, 2024 in corresponding Chinese Application No. 202010687624.0, translated, 16 pages.
(Continued)

*Primary Examiner* — Phong La
(74) *Attorney, Agent, or Firm* — MH2 TECHNOLOGY LAW GROUP LLP

(57) ABSTRACT

A signal transmission method includes: sending, by a first communication node, system information, where the system information includes configuration information of at least one physical random access channel (PRACH), a PRACH is associated with at least one synchronization signal group, and the synchronization signal group includes a plurality of synchronization signals; receiving, by the first communication node, a random access preamble sent by a second communication node according to the system information; and sending, by the first communication node, a response
(Continued)

message for the random access preamble in a preset time window.

13 Claims, 8 Drawing Sheets

(58) Field of Classification Search
CPC ... H04W 74/006; H04W 48/08; H04W 48/16; H04W 48/12; H04L 5/0051; H04L 5/0037; H04L 5/0016; H04L 5/0023; H04L 5/0048
See application file for complete search history.

(56) References Cited

U.S. PATENT DOCUMENTS

| | | | |
|---|---|---|---|
| 2019/0173721 A1 | 6/2019 | Gao et al. | |
| 2019/0268863 A1 | 8/2019 | Chen et al. | |
| 2019/0342921 A1* | 11/2019 | Loehr | H04W 72/23 |
| 2019/0363809 A1 | 11/2019 | Yoon et al. | |
| 2020/0045748 A1 | 2/2020 | Yan et al. | |
| 2020/0128588 A1* | 4/2020 | Xiong | H04W 72/0453 |
| 2020/0146057 A1 | 5/2020 | Jeon et al. | |
| 2020/0178309 A1 | 6/2020 | Tie et al. | |
| 2020/0260486 A1* | 8/2020 | Zhou | H04W 28/0278 |
| 2020/0288503 A1* | 9/2020 | Sahlin | H04W 16/28 |
| 2020/0329414 A1 | 10/2020 | Talukdar et al. | |
| 2021/0013959 A1 | 1/2021 | Yuan et al. | |
| 2021/0274561 A1 | 9/2021 | Li et al. | |
| 2022/0256612 A1* | 8/2022 | MolavianJazi | H04W 72/23 |
| 2022/0408483 A1* | 12/2022 | Lei | H04W 74/0891 |

FOREIGN PATENT DOCUMENTS

| | | | | |
|---|---|---|---|---|
| CN | 108737039 A | | 11/2018 | |
| CN | 109041593 A | | 12/2018 | |
| CN | 105379336 B | * | 7/2019 | ............ H04L 5/14 |
| CN | 110034832 A | | 7/2019 | |
| CN | 110140411 A | | 8/2019 | |
| CN | 110149642 A | | 8/2019 | |
| CN | 110380837 A | | 10/2019 | |
| CN | 110392991 A | | 10/2019 | |
| CN | 111901865 A | | 11/2020 | |
| WO | 2018028708 A1 | | 2/2018 | |
| WO | 2018210463 A1 | | 11/2018 | |
| WO | 2019045633 A1 | | 3/2019 | |

OTHER PUBLICATIONS

European Communication pursuant to Rule 164(1) EPC dated Jun. 27, 2024 in corresponding European Application No. 21842875.3, 17 pages.
International Search Report and Written Opinion dated Sep. 28, 2021 in corresponding International Application No. PCT/CN2021/105265, translated, 15 pages.

* cited by examiner

SIGNAL TRANSMISSION METHODS AND APPARATUSES, NODES, AND STORAGE MEDIA

CROSS-REFERENCE TO RELATED APPLICATIONS

This application is a national phase entry under 35 USC 371 of International Patent Application No. PCT/CN2021/105265, filed on Jul. 8, 2021, which claims priority to Chinese Patent Application No, 202010687624.0, filed on Jul. 16, 2020, which are incorporated herein by reference in their entirety.

TECHNICAL FIELD

The present disclosure relates to the field of wireless communication technologies, and for example, to signal transmission methods and apparatuses, nodes and storage media.

BACKGROUND

Cell splitting technology in cellular networks is considered to be a way to effectively increase the capacity of wireless systems. However, with the deployment of various low-power network nodes such as various microcells, small cells, home base stations and relay nodes in traditional cellular networks, the cellular networks exhibit an increasing trend of isomerization and densification, which may cause problems of reducing system capacity and user experience, such as serious inter-cell interference, and frequent cell switching of user equipment (UE) in a moving process. Moreover; the system capacity is limited when the traditional cellular cells are densely networked, and there is an inflection point in the system capacity as a radius of the cell is reduced.

SUMMARY

Embodiments of the present disclosure provide a signal transmission method, and the method includes:
  determining, by a first communication node, a plurality of access points within a coverage area; controlling, by the first communication node, the plurality of access points to send a plurality of synchronization signals and a plurality of master information blocks (MIBs), where the plurality of synchronization signals constitute one or more synchronization signal groups.

Embodiments of the present disclosure provide a signal transmission method, and the method includes:
  receiving, by a second communication node, a plurality of synchronization signals and a plurality of MIBs, where the plurality of synchronization signals constitute one or more synchronization signal groups; detecting, by the second communication node, the plurality of synchronization signals and the plurality of MIBs; and determining, by the second communication node, a synchronization signal group to be accessed according to a detection result and obtaining, by the second communication node, a MIS associated with a synchronization signal group index of the synchronization signal group to be accessed.

Embodiments of the present disclosure provide a signal transmission method, and the method includes:
  sending, by a first communication node, system information, where the system information includes configuration information of at least one physical random access channel (PRACH), a PRACH is associated with one or more synchronization signal groups, and the synchronization signal group includes a plurality of synchronization signals; receiving, by the first communication node, a random access preamble sent by a second communication node according to the system information; and sending, by the first communication node, a response message for the random access preamble in a preset time window.

Embodiments of the present disclosure provide a signal transmission method, and the method includes:
  receiving, by a second communication node, system information, where the system information includes configuration information of at least one PREACH, and a PRACH is associated with one or more synchronization signal groups; determining, by the second communication node, a target PRACH in the at least one PRACH according to signal parameters of synchronization signals in a synchronization signal group; and sending, by the second communication node, a random access preamble in the target PRACH.

Embodiments of the present disclosure provide a signal transmission method, and the method includes:
  sending, by a first communication node, a first random access response message in a preset time window after receiving a random access preamble sent by a second communication node in a pre-configured PRACH; sending, by the first communication node, a second random access response message according to the first random access response message, where the first random access response message carries a third quasi co-location (QCL) relationship of the second random access response message.

Embodiments of the present disclosure provide a signal transmission method, and the method includes:
  sending, by a second communication node, a random access preamble in a pre-configured PRACH; receiving, by the second communication node, a first random access response message sent by a first communication node for the random access preamble in a preset time window, where the first random access response message carries a third QCL relationship of a second random access response message; and receiving, by the second communication node, the second random access response message according to the first random access response message.

Embodiments of the present disclosure provide a signal transmission method, and the method includes:
  determining, by a first communication node, a working state of a second communication node, where the first communication node configures service node topology information for the second communication node, in a case where the working state of the second communication node is a connected state.

Embodiments of the present disclosure provide a signal transmission method, and the method includes:
  obtaining, by a second communication node, service node topology information configured by a first communication node; determining, by the second communication node, a relative position of the second communication node in a service node network according to the service node topology information and a current positioning of the second communication node, in a case where the second communication node determines that the second communication node is working in a non-connected state; and determining, by the second communication node, a detection mode of a synchronization signal according to the relative position.

Embodiments of the present disclosure provide a signal transmission apparatus, and the apparatus includes:

a determination module used to determine a plurality of access points within a coverage area; and a control module used to control the plurality of access points to send a plurality of synchronization signals and a plurality of MIBs, where the plurality of synchronization signals constitute one or more synchronization signal groups.

Embodiments of the present disclosure provide a signal transmission apparatus, and the apparatus includes:

a receiving module used to receive a plurality of synchronization signals and a plurality of MIBs, where the plurality of synchronization signals constitute one or more synchronization signal groups; a detection module used to detect the plurality of synchronization signals and the plurality of MIBs; a determination module used to determine a synchronization signal group to be accessed according to a detection result; and an obtaining module used to obtain a MIB associated with a synchronization signal group index to be accessed.

Embodiments of the present disclosure provide a signal transmission apparatus, and the apparatus includes:

a sending module used to send system information, where the system information includes configuration information of at least one MACH, a PRACH is associated with one or more synchronization signal groups, and the synchronization signal group includes a plurality of synchronization signals; and a receiving module used to receive a random access preamble sent by a second communication node according to the system information, where the sending module is further used to send a response message for the random access preamble in a preset time window.

Embodiments of the present disclosure provide a signal transmission apparatus, and the apparatus includes:

a receiving module used to receive system information, where the system information includes configuration information of at least one PRACH, and a PRACH is associated with one or more synchronization signal groups; a determination module used to determine a target PRACH in the at least one PRACH according to signal parameters of synchronization signals in a synchronization signal group; and a sending module used to send a random access preamble in the target PRACH.

Embodiments of the present disclosure provide a signal transmission apparatus, and the apparatus includes:

a receiving module used to send a first random access response message in a preset time window after receiving a random access preamble sent by a second communication node in a pre-configured PRACH; and a sending module used to send a second random access response message according to the first random access response message, where the first random access response message carries a third QCL relationship of the second random access response message.

Embodiments of the present disclosure provide a signal transmission apparatus, and the apparatus includes:

a sending module used to send a random access preamble in a pre-configured PRACH; and a receiving module used to receive a first random access response message sent by a first communication node for the random access preamble in a preset time window, where the first random access response message carries a third QCL relationship of a second random access response message, and the receiving module is further used to receive the second random access response message according to the first random access response message.

Embodiments of the present disclosure provide a signal transmission apparatus, and the apparatus includes:

a determination module used to determine a working state of a second communication node; and a configuration module used to configure service node topology information for the second communication node in a case where the working state of the second communication node is a connected state.

Embodiments of the present disclosure provide a signal transmission apparatus, and the apparatus includes:

an obtaining module used to obtain service node topology information configured by a first communication node; and a determination module used to determine a relative position of the apparatus in a service node network according to the service node topology information and a current positioning of the apparatus in a case where the apparatus is working in a non-connected state, where the determination module is further used to determine a detection mode of a synchronization signal according to the relative position.

Embodiments of the present disclosure provide a communication node, and the node includes a memory, a processor, a program stored on the memory and executable in the processor, and a data bus provided for achieving connection and communication between the processor and the memory. The program, when executed by the processor, implements the signal transmission methods performed by the above first communication node.

Embodiments of the present disclosure provide a communication node, and the node includes a memory, a processor, a program stored on the memory and executable in the processor, and a data bus provided for achieving connection and communication between the processor and the memory. The program, when executed by the processor, implements the signal transmission methods performed by the above second communication node.

Embodiments of the present disclosure provide a non-transitory readable and writable storage medium provided for computer storage. The storage medium has stored thereon one or more programs executable by one or more processors to implement the signal transmission methods performed by the above first communication node.

Embodiments of the present disclosure provide a non-transitory readable and writable storage medium provided for computer storage. The storage medium has stored thereon one or more programs executable by one or more processors to implement the signal transmission methods performed by the above second communication node.

DETAILED DESCRIPTION

Embodiments of the present disclosure will be described in detail with reference to the accompanying drawings below.

In addition, in the embodiments of the present disclosure, the words/phrases such as "optionally" or "for example" are used to present an example, illustration, or explanation. Any embodiment or design solution described herein with "optionally" or "for example" in the embodiments of the present disclosure is not necessarily to be construed as preferred or advantageous over other embodiments or design solutions. Rather, the use of the words/phrases such as "optionally" or "for example" is intended to present relevant concepts in a specific manner.

A solution to the above problems is to distribute a plurality of access points (APs) each installed with one or more antennas in a large area in a cell-free system, transmit data to a central processing unit (CPU) through a fronthaul link, and use the same time-frequency resources to provide services for a plurality of user equipments (UEs). In the system, the UE in a connected state has a cell centered on itself, and the cell moves along with the UE in the moving process, so that the influence of the problems such as the inter-cell interference and frequent switching on the UE may be reduced to the maximum extent. However, in the cell-free system, it is assumed that the UE works in the cell-free mode after a radio resource control (RRC) connection has been established. Before the UE works in the cell-free mode, the UE needs to establish a RRC connection with a cell in the cellular network in the form of the cellular network, and then switch from the cellular system to the cell-free system.

A defect of the above solution is that the cellular system and the cell-free system are designed based on two different design concepts, where the former is centered on a base station, and the latter is centered on the UE, the two systems with different design concepts are combined together. When the UE accesses the cell-free system, the UE still has the problems such as serious inter-cell interference, frequent cell selection or cell reselection.

The present disclosure provides signal transmission methods and apparatuses, nodes and storage media, aiming at making an access node select and access a wireless system in a more scientific manner, so as to avoid problems such as inter-cell interference and frequent cell selection to the greatest extent.

Figure 1:
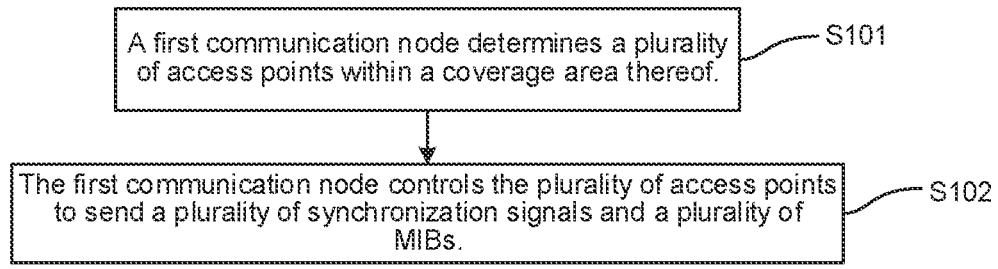
FIG. 1 is a flowchart of a signal transmission method, in accordance with embodiments of the present disclosure.

FIG. 1 is a flowchart of a signal transmission method, in accordance with embodiments of the present disclosure. The method may be applied to a first communication node. As shown in FIG. 1, the method may include the following steps S101 and S102.

In S101, the first communication node determines a plurality of access points within a coverage area.

For example, the first communication node in the embodiments of the present disclosure may be a device having a processor in a wireless communication system (e.g., a cell-free system). Since the first communication node has a certain coverage area, the first communication node may determine the plurality of access points within the coverage area thereof.

In S102, the first communication node controls the plurality of access points to send a plurality of synchronization signals and a plurality of master information blocks (MIBs).

After the first communication node determines the plurality of access points within the coverage area thereof, i.e., S101, the processor (e.g., a central processing unit (CPU)) of the first communication node may control the plurality of access points to send the plurality of synchronization signals and the plurality of MIBs.

The plurality of synchronization signals sent constitute one or more synchronization signal groups; each synchronization signal corresponds to a synchronization signal index, and the synchronization signal index corresponds to a synchronization signal group index and a MIB associated with the synchronization signal group index.

The embodiments of the present disclosure provide the signal transmission method. The method includes: determining, by the first communication node, the plurality of access points within the coverage area, and controlling, by the first communication node, the plurality of access points to send the plurality of synchronization signals and the plurality of MIBs. The plurality of synchronization signals constitute the one or more synchronization signal groups. In this way, the first communication node controls transmission of the one or more synchronization signal groups, which may make a receiver use strength of synchronization signals in a synchronization signal group as a reference for accessing a wireless system, and make access selection more scientific, so as to avoid the problems such as the inter-cell interference and frequent cell selection to the greatest extent.

In an example, in a case where synchronization signal group indexes of two synchronization signals among the plurality of synchronization signals are different, the two synchronization signals correspond to different scrambling codes for scrambling associated MIBs. In this case, information carried by each MIB is also different in general.

In another example, in a case where at least two synchronization signal group indexes corresponding to at least two synchronization signals among the plurality of synchronization signals are the same, scrambling codes, for scrambling associated MIBs, corresponding to the at least two synchronization signal group indexes are the same. In a case where the at least two synchronization signals have a same sending time, the MIBs associated with the synchronization signal group indexes corresponding to the at least two synchronization signals carry same information.

For example, in a case where the synchronization signal index s is determined, a way of obtaining the synchronization signal group index g may be either of the following two manners:

$$g = \left\lfloor \frac{s}{L} \right\rfloor \quad (1)$$

$$\text{or } g = s\% L \quad (2)$$

where L in formula (1) and formula (2) is a preset positive integer greater than 1.

In an example, in a case where the synchronization signal group indexes corresponding to the at least two synchronization signals are the same, the at least two synchronization signals satisfy a first quasi co-location (QCL) relationship by default. The first QCL relationship is a relationship where transmission channels of the at least two synchronization signals are the same in at least one of a Doppler shift parameter, a Doppler spread parameter, an average delay parameter, a delay spread parameter and a spatial reception parameter.

In an example, two types of synchronization signals may constitute the synchronization signals. For example, first synchronization signals and second synchronization signals constitute the synchronization signals. Assuming that the number of the first synchronization signals is M, and the number of the second synchronization signals is N, where M and N are both positive integers greater than 1, then the M first synchronization signals and the N second synchronization signals may constitute the plurality of synchronization signals. Assuming that the first synchronization signals with an index i and the second synchronization signals with an index j constitute the synchronization signals, then the index s of the synchronization signals may be:

$$s = iN + j \quad (3)$$

$$\text{or } s = i + jM \quad (4)$$

That is, the number of available synchronization signals is a product of M and N (M×N) at most. Optionally, a value of L may be a multiple of M or N.

Figure 2:
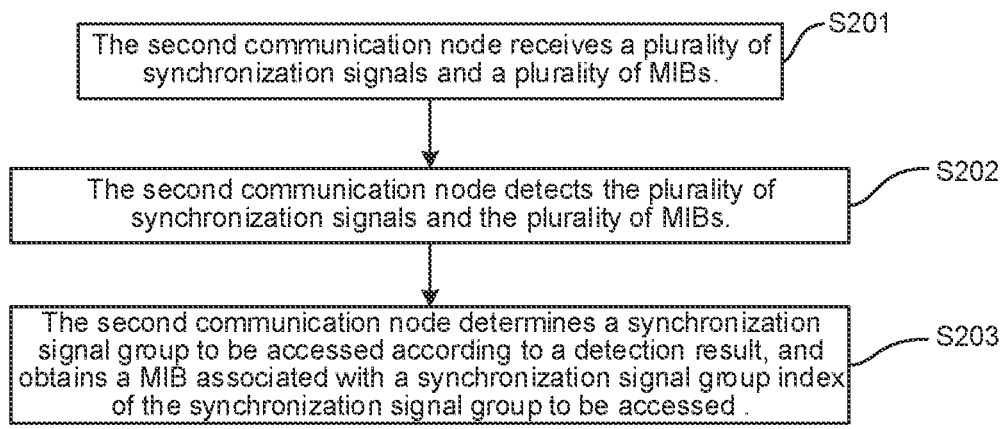
FIG. 2 is a flowchart of a signal transmission method, in accordance with embodiments of the present disclosure.

FIG. 2 is a flowchart of a signal transmission method, in accordance with embodiments of the present disclosure. The method may be applied to a second communication node. As shown in FIG. 2, the method includes steps S201 to S203.

In S201, the second communication node receives a plurality of synchronization signals and a plurality of master information blocks (MIBs).

For example, the second communication node may be a user equipment (UE) in a wireless communication system (e.g., a cell-free system), and the plurality of synchronization signals received by the second communication node may constitute one or more synchronization signal groups. That is, the second communication node may receive one or more synchronization signal groups.

Optionally, each of the plurality of synchronization signals received by the second communication node may correspond to a synchronization signal index, and the synchronization signal index corresponds to a synchronization signal group index and a MIB associated with the synchronization signal group index.

In S202, the second communication node detects the plurality of synchronization signals and the plurality of MIBs.

In S203, the second communication node determines a synchronization signal group to be accessed according to a detection result, and obtains a MIB associated with a synchronization signal group index of the synchronization signal group to be accessed.

When the second communication node accesses the wireless communication system, the second communication node may first detect the received synchronization signals, and in a case where synchronization signal group indexes corresponding to at least two synchronization signals among the plurality of synchronization signals are the same, the second communication node defaults that the at least two synchronization signals satisfy a first quasi co-location (QCL) relationship. For example, the first QCL relationship may be a relationship where transmission channels of the at least two synchronization signals are the same in at least one of a Doppler shift parameter, a Doppler spread parameter, an average delay parameter, a delay spread parameter and a spatial reception parameter.

Based on the above default case, the second communication node selects the optimal synchronization signal group as the synchronization signal group to be accessed finally according to the detection result, and obtains the MIB associated with the synchronization signal group index of the synchronization signal group. After the second communication node obtains the MIB, the second communication node may obtain resources of the wireless system according to an indication of the MIS and initiate random access.

For example, the basis for the second communication node to determine the optimal synchronization signal group may be that reference signal received power (RSRP) or reference signal received quality (RSRQ) is the strongest after the synchronization signals in the synchronization signal group are combined.

The embodiments of the present disclosure provide the signal transmission method. The second communication node receives the plurality of synchronization signals and the plurality of MIBs, where the plurality of synchronization signals constitute the one or more synchronization signal groups; the second communication node detects the plurality of synchronization signals and the plurality of MIBs; and the second communication node determines the synchronization signal group to be accessed according to the detection result, and obtains the MIS associated with the synchronization signal group index of the synchronization signal group to be accessed. In this way, the second communication node may use relevant parameters of the plurality of synchronization signals of the synchronization signal group as a reference for accessing the wireless system. Compared with a solution in the traditional cellular system in which each synchronization signal corresponds to a physical cell, and each cell has a respective MIB, and when the second communication node performs initial access, only the cell corresponding to the strongest synchronization signal can be selected, the selection method of the second communication node in the solution provided in the embodiments of the present disclosure is more scientific. In the traditional cellular system, the MIB of each cell is independent, and even though the MISS contain same information, the second communication node cannot combine the MISS, and except for a MIS of a target cell, other MIBs exist as interference; while in the solution provided in the embodiments of the present disclosure, the second communication node may combine and receive MIBs in a synchronization signal group, so as to further improve the receiving performance of the MIBs.

In an example, in the case where the at least two synchronization signal group indexes corresponding to the at least two synchronization signals are the same, scrambling codes, for scrambling associated MIBs, corresponding to the at least two synchronization signal group indexes are the same. In a case where the at least two synchronization signals have a same sending time, the MIBs associated with the synchronization signal group indexes corresponding to the at least two synchronization signals carry same information.

Figure 3:
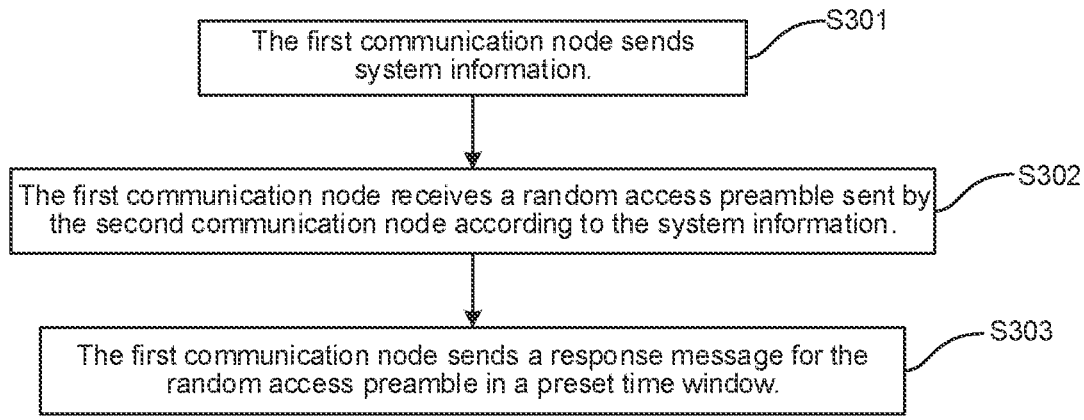
FIG. 3 is a flowchart of a signal transmission method, in accordance with embodiments of the present disclosure.

FIG. 3 is a flowchart of a signal transmission method, in accordance with embodiments of the present disclosure. The method may be applied to the first communication node. As shown in FIG. 3, the method includes steps S301 to S303.

In S301, the first communication node sends system information.

In the embodiments of the present disclosure, the first communication node may be a device having a processor in a wireless communication system (e.g., a cell-free system), and the system information sent by the first communication node may include configuration information of at least one physical random access channel (PRACH). For example, the configuration information may include a preamble format of the PRACH, a time-frequency position of the PRACH, a synchronization signal set associated with the PRACH.

In the embodiments of the present disclosure, a PRACH may be associated with one or more synchronization signal groups, and the synchronization signal group may include a plurality of synchronization signals.

For example, if configuration information of a plurality of sets of PRACH resources is configured in the system information, a synchronization signal group set associated with each set of PRACH may be different for different PRACH resources. For example, it is assumed that two sets of PRACH resources are configured in the system information, a first set of PRACH resource may be associated with a synchronization signal group 1, and a second set of PRACH resource may be associated with the synchronization signal group 1 and a synchronization signal group 2.

In S302, the first communication node receives a random access preamble sent by the second communication node according to the system information.

The random access preamble in this step may be sent by the second communication node in a PRACH resource pre-configured by the first communication node.

In S303, the first communication node sends a response message for the random access preamble in a preset time window.

After the first communication node has detected the random access preamble sent by the second communication node in the pre-configured PRACH resource, the first communication node may send the response message for the random access preamble in the preset time window.

The embodiments of the present disclosure provide the signal transmission method. The first communication node sends the system information, where the system information includes the configuration information of the at least one MACH, the PRACH is associated with the one or more synchronization signal groups, and the synchronization signal group includes the plurality of synchronization signals; the first communication node receives the random access preamble sent by the second communication node according to the system information and sends the response message for the random access preamble in the preset time window. Since the PRACH is associated with the one or more synchronization signal groups, compared with a traditional manner in which a PRACH is associated with only one synchronization signal or cell, the first communication node may refer to the plurality of synchronization signals associated with the PRACH when sending the response message according to the random access preamble sent by the second communication node, so as to achieve better performance.

In an example, a physical downlink control channel (PDCCH) indicating the response message, a demodulation reference signal corresponding to the PDCCH, and synchronization signals in a synchronization signal group associated with the PRACH satisfy a second quasi co-location (QCL) relationship. The second QCL relationship may be a relationship where a transmission channel for transmitting the PDCCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

For example, the association relationship may include the following possible cases.

In a first case, each of one or more of the Doppler shift parameter, the Doppler spread parameter, the average delay parameter, the delay spread parameter and the spatial reception parameter of a wireless channel (i.e., the transmission channel) through which the PDCCH and the demodulation reference signal corresponding to the PDCCH are transmitted is equal to a sum of parameters of a corresponding type of the channels through which the above synchronization signals are transmitted.

In a second case, each of one or more of the Doppler shift parameter, the Doppler spread parameter, the average delay parameter, the delay spread parameter and the spatial reception parameter of the wireless channel through which the PDCCH and the demodulation reference signal corresponding to the POOCH are transmitted is equal to a weighted combination of parameters of a corresponding type of the channels through which the synchronization signals are transmitted.

Figure 4:
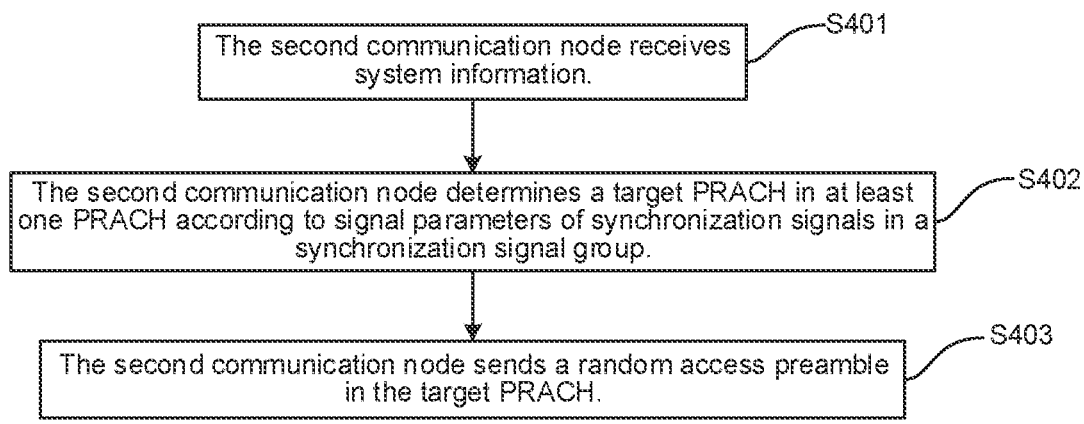
FIG. 4 is a flowchart of a signal transmission method, in accordance with embodiments of the present disclosure.

FIG. 4 is a flowchart of a signal transmission method, in accordance with embodiments of the present disclosure. The method may be applied to the second communication node. As shown in FIG. 4, the method includes steps S401 to S403.

In S401, the second communication node receives system information.

The second communication node may be a user equipment (UE) in a wireless communication system (e.g., a cell-free system), and the system information received by the second communication node may include configuration information of at least one physical random access channel (PRACH). A PRACH is associated with one or more synchronization signal groups, and the synchronization signal group may include a plurality of synchronization signals.

In S402, the second communication node determines a target PRACH in the at least one PRACH according to signal parameters of the synchronization signals in the synchronization signal group.

After receiving the system information, the second communication node may obtain configuration information of the PRACH according to the system information. If a plurality of sets of PRACH resources are configured in the system information and a synchronization signal set associated with each set of PRACH resource is different, the second communication node may select one of the plurality of sets of PRACH resources as the target PRACH according to a detection situation of the received synchronization signals, a quality of service (QoS) requirements and the like.

In a case where only one set of PRACH resource is configured in the system information, the set of PRACH resource is the target PRACH.

In S403, the second communication node sends a random access preamble in the target PRACH.

For example, the second communication node may send a preset random access preamble in the target PRACH.

The embodiments of the present disclosure provide the signal transmission method. The second communication node receives the system information, where the system information includes the configuration information of the at least one PRACH, and the PRACH is associated with the one or more synchronization signal groups; and the second communication node determines the target PRACH in the at least one PRACH according to the signal parameters of the synchronization signals in the synchronization signal group and sends the random access preamble in the target PRACH. In the embodiments of the present disclosure, the second communication node may select an appropriate PRACH resource according to actual situations of the service, so as to well satisfy the user-centric requirements in the cell-free network.

In an example, a manner in which the second communication node determines the target PRACH in the S402 may include the following.

The second communication node selects the PRACH resource according to quality of the received synchronization signals (e.g., reference signal received power (RSRP), or reference signal received quality (RSRQ)). The poorer the quality of the synchronization signals, the more the number of synchronization signals or synchronization signal groups associated with the PRACH resource selected by the second communication node. For example, it is assumed that two sets of PRACH resources are configured in the system information, a first set of MACH resource is associated with a synchronization signal group 1, and a second set of PRACH resource is associated with the synchronization signal group 1 and a synchronization signal group 2. In a case where the quality of the received synchronization signals is greater than a preset threshold, the second communication node may select the first set of PRACH resource; otherwise, the second communication node selects the second set of PRACH resource.

Alternatively, the second communication node selects the PRACH resource according to the QoS requirements of the service. For example, the higher a transmission rate required for the service of the second communication node, the more the number of synchronization signals or synchronization signal groups associated with the PRACH resource selected by the second communication node.

In an example, in the S403, when the second communication node sends the preset random access preamble in the selected target PRACH resource, an initial transmission power of the second communication node may be determined according to a received power of the plurality of synchronization signals associated with the selected PRACH resource. For example, the initial transmission power may be determined in the following possible manners.

In a first manner, the system information indicates the transmission power of the plurality of synchronization signals associated with the PRACH resource, and the second communication node may estimate a path loss of each synchronization signal from a sender to the second communication node according to the power of the received synchronization signals; and then the second communication node determines the initial transmission power of the random access preamble according to the maximum or minimum path loss.

In a second manner, the system information indicates the transmission power of the plurality of synchronization signals associated with the PRACH resource, and the second communication node may estimate the path loss of each synchronization signal from the sender to the second communication node according to the power of the received synchronization signals; and then the second communication node determines the initial transmission power of the random access preamble according to an average value of a plurality of path losses.

In a third manner, the system information indicates the transmission power of the plurality of synchronization signals associated with the PRACH resource, and the second communication node may estimate the path loss of each synchronization signal from the sender to the second communication node according to the power of the received synchronization signals, and calculate path losses of synchronization signals whose received power is greater than a certain threshold; and then the second communication node determines the initial transmission power of the random access preamble according to an average value of the calculated path losses.

In an example, after the S403, the second communication node may further receive a response message sent by the first communication node for the random access preamble in the preset time window.

Optionally, the second communication node may default that a physical downlink control channel (POOCH) indicating the response message, the demodulation reference signal corresponding to the PDCCH, and the synchronization signals in the synchronization signal group associated with the PRACH satisfy a second quasi co-location (QCL) relationship. The second QCL relationship may be a relationship where a transmission channel for transmitting the PDCCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

After determining that the POOCH of the response message, the demodulation reference signal corresponding to the POOCH, and the synchronization signal associated with the PRACH resource satisfy the second QCL relationship, the second communication node may perform channel estimation by using the relationship and the received demodulation reference signal, so as to detect the POOCH and the indication information thereof.

Figure 5:
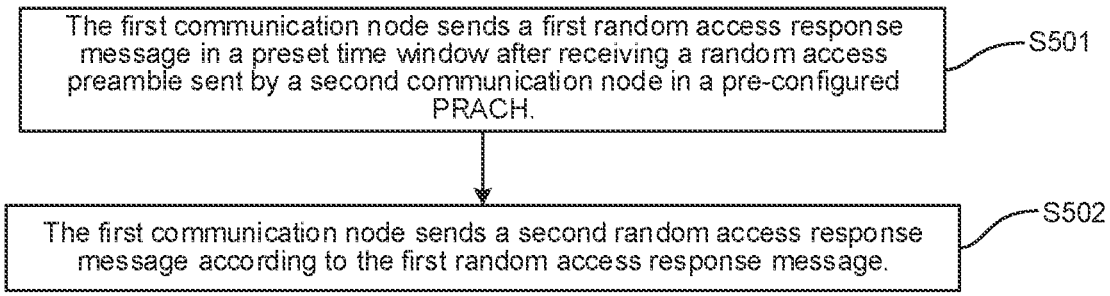
FIG. 5 is a flowchart of a signal transmission method, in accordance with embodiments of the present disclosure.

FIG. 5 is a flowchart of a signal transmission method, in accordance with embodiments of the present disclosure. The method may be applied to the first communication node. As shown in FIG. 5, the method includes steps S501 and S502.

In S501, the first communication node sends a first random access response message in a preset time window after receiving a random access preamble sent by a second communication node in a pre-configured physical random access channel (PRACH).

Optionally, the first communication node may be a device having a processor in a wireless communication system (e.g., a cell-free system), and the first random access response message sent by the first communication node may carry one piece of the following information:

index information of the received random access preamble, time-frequency position information of second random access response message, time-frequency position information and search space information of a physical downlink control channel (PDCCH) indicating the second random access response message, and the like.

In S502, the first communication node sends the second random access response message according to the first random access response message. The first random access response message carries a third quasi co-location (QCL) relationship of the second random access response message.

For example, the third QCL relationship of the second random access response message may include: a QCL relationship between the second random access response message and the demodulation reference signal corresponding to the second random access response message; and/or a QCL relationship between the PDCCH corresponding to the second random access response message and the demodulation reference signal corresponding to the PDCCH.

Optionally, the second random access response message carries at least timing advance information, and may further carry uplink authorization information.

In the embodiments of the present disclosure, after receiving the random access preamble sent by the second communication node in the pre-configured PRACH the first communication node sends the first random access response message in the preset time window, and sends the second random access response message according to the first random access response message. The first random access response message carries the third QCL relationship of the second random access response message. In this way, the first communication node is not subject to the limitation that a cell can be selected only by the second communication node to send the random access response, thereby providing convenience for greatly improving the performance of the second communication node randomly accessing a wireless network. Moreover, the method has the advantages of simplicity in implementation, low signaling overhead and the like.

In an example, the third QCL relationship may be: a relationship where a transmission channel for transmitting the second random access response message and the demodulation reference signal corresponding to the second random access response message and a transmission channel of a synchronization signal initially selected by the second communication node are the same in at least one of a Doppler shift parameter, a Doppler spread parameter, an average delay parameter, a delay spread parameter and a spatial reception parameter; and/or a relationship where a transmission channel for transmitting the PDCCH corresponding to the second random access response message and the demodulation reference signal corresponding to the PDCCH and the transmission channel of the synchronization signal initially selected by the second communication node are the same in at least one of the Doppler shift parameter, the Doppler spread parameter, the average delay parameter, the delay spread parameter, and the spatial receiving parameter.

Optionally, the PDCCH may indicate information such as a time offset position and a coded modulation format of a physical downlink shared channel (PDSCH) corresponding to the second random access response message.

In an example, it is possible to indicate the third QCL relationship of the second random access response message by displaying signaling, or it is possible to indicate whether the third QCL relationship of the second random access response message needs to be updated by displaying the signaling. For example, it is assumed that the transmission channel of the second random access response message and the demodulation reference signal corresponding thereto and the transmission channel of the synchronization signal initially selected by the second communication node satisfy the third QCL relationship; and/or it is assumed that the transmission channel of the PDCCH corresponding to the second random access response message and the demodulation reference signal corresponding to the PDCCH and the transmission channel of the synchronization signal initially selected by the second communication node satisfy the third QCL relationship. If it is indicated that the third QCL relationship of the second random access response message needs to be updated, one or more of the synchronization signal and the third QCL related information may be updated according to the indication.

Figure 6:
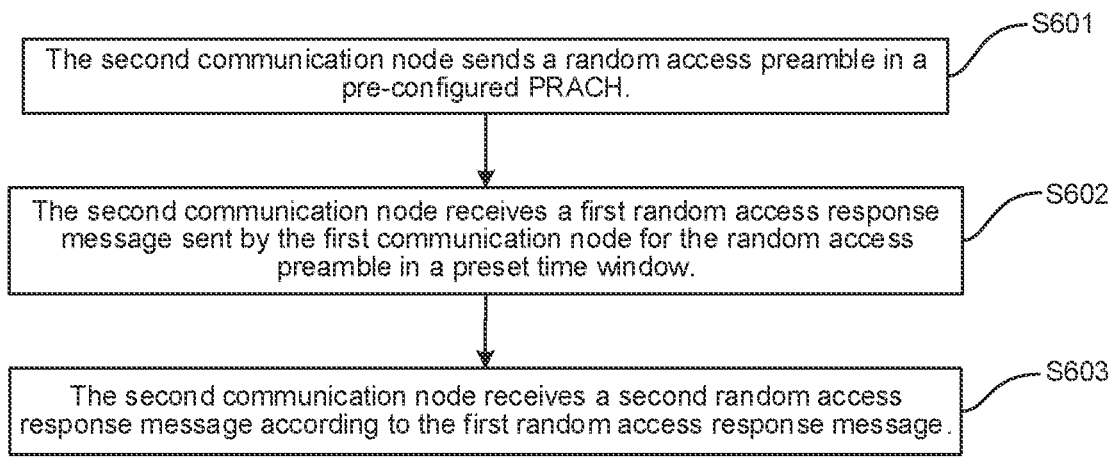
FIG. 6 is a flowchart of a signal transmission method, in accordance with embodiments of the present disclosure.

FIG. 6 is a flowchart of a signal transmission method, in accordance with embodiments of the present disclosure. The method may be applied to the second communication node. As shown in FIG. 6, the method includes steps S601 to S603.

In S601, the second communication node sends a random access preamble in a pre-configured physical random access channel (PRACH).

The second communication node may be a user equipment (UE) in a wireless communication system (e.g., a cell-free system), and the second communication node may send a preset random access preamble in the MACH resource selected by the second communication node.

In S602, the second communication node receives the first random access response message sent by the first communication node for the random access preamble in a preset time window.

The second communication node may detect the first random access response message in the preset time window, and the detected first random access response message carries a third quasi co-location (QCL) relationship of the second random access response message.

Optionally, it is possible to indicate the third QCL relationship of the second random access response message by displaying signaling, or it is possible to indicate whether the third QCL relationship of the second random access response message needs to be updated by displaying the signaling.

In S603, the second communication node receives the second random access response message according to the first random access response message.

For example, in a case where the third QCL relationship of the second random access response message is indicated to be updated, the second communication node may update one or more of the synchronization signal and the third QCL related information according to the indication.

In the embodiments of the present disclosure, the first random access response message received by the second communication node carries the third QCL relationship of the second random access response message, which may provide convenience for improving the performance of the second communication node randomly accessing a wireless network. Moreover, the method has the advantages of simplicity in implementation, low signaling overhead and the like.

In an example, the third QCL relationship of the second random access response message may include: a QCL relationship between the second random access response message and the demodulation reference signal corresponding to the second random access response message; and/or a QCL relationship between a physical downlink control channel (PDCCH) corresponding to the second random access response message and the demodulation reference signal corresponding to the PDCCH.

In an example, the third QCL relationship may be: a relationship where a transmission channel for transmitting the second random access response message and the demodulation reference signal corresponding to the second random access response message and a transmission channel of a synchronization signal initially selected by the second communication node are the same in at least one of a Doppler shift parameter, a Doppler spread parameter, an average delay parameter, a delay spread parameter and a spatial reception parameter; and/or a relationship where a transmission channel for transmitting the POOCH corresponding to the second random access response message and the demodulation reference signal corresponding to the POOCH and the transmission channel of the synchronization signal initially selected by the second communication node are the same in at least one of the Doppler shift parameter, the Doppler spread parameter, the average delay parameter, the delay spread parameter and the spatial reception parameter.

Figure 7:
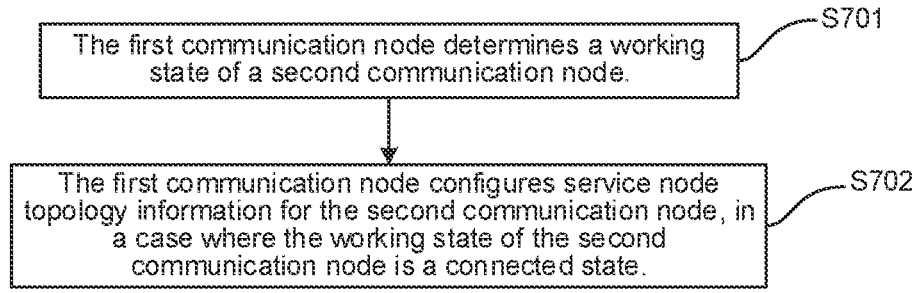
FIG. 7 is a flowchart of a signal transmission method, in accordance with embodiments of the present disclosure.

FIG. 7 is a flowchart of a signal transmission method, in accordance with embodiments of the present disclosure. The method may be applied to the first communication node. As shown in FIG. 7, the method includes steps S701 and S702.

In S701, the first communication node determines a working state of the second communication node.

The first communication node may be a device having a processor in a wireless communication system (e.g., a cell-free system), and the second communication node may be a user equipment (UE) in the wireless communication system (e.g., the cell-free system), and the working state of the second communication node may include a connected state, an idle state, or the like.

In S702, the first communication node configures service node topology information for the second communication node, in a case where the working state of the second communication node is the connected state.

In a case where the first communication node determines that the second communication node is working in the connection state, i.e., the second communication node is transmitting a service, the first communication node configures the service node topology information for the second communication node.

For example, the topology information may include geographic locations of service nodes in the wireless communication system, and interrelationships of the service nodes in orientation, etc.

For example, a plurality of synchronization signal indexes or cell indexes and relative relationships of the synchronization signal indexes or cell indexes in geographic orientation may be provided in the configured topology information. For example, a direction and a distance of a cell index B relative to a cell index A are indicated. Alternatively, absolute position information of each service node may be provided in the configured topology information.

The embodiments of the present disclosure provide the signal transmission method. In the case where the first communication node determines that the working state of the second communication node is the connected state, the first communication node configures the service node topology information for the second communication node. Since a high transmission rate may be provided in the cell-free system, service data of the second communication node may be quickly transmitted. Therefore, configuring the service node topology information for the second communication node in the connected state may enable the second communication node to perform detection in the idle state or a deactivation state according to the topology information, thereby reducing the power consumption of the second communication node.

Figure 8:
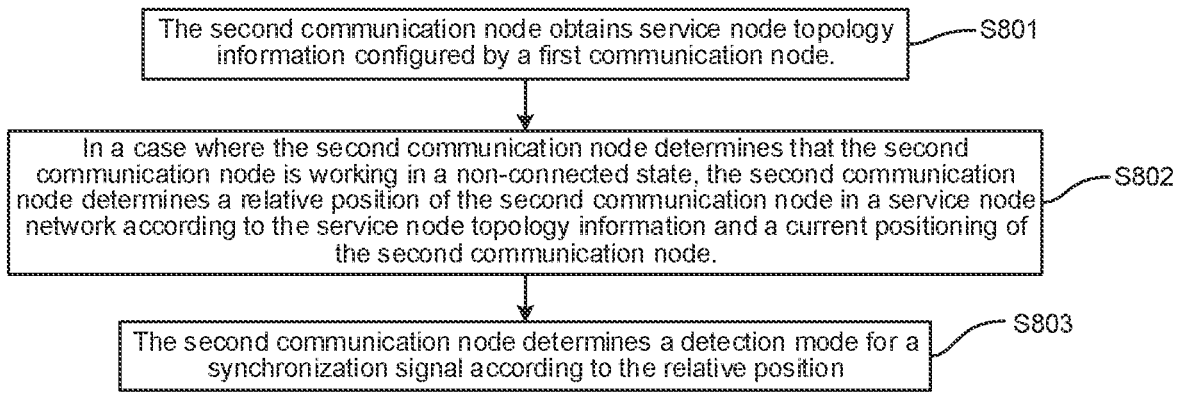
FIG. 8 is a flowchart of a signal transmission method, in accordance with embodiments of the present disclosure.

FIG. 8 is a flowchart of a signal transmission method, in accordance with embodiments of the present disclosure. The method may be applied to the second communication node. As shown in FIG. 8, the method includes steps S801 to S803.

In S801, the second communication node obtains service node topology information configured by the first communication node.

The second communication node may be a user equipment (UE) in a wireless communication system (e.g., a cell-free system), and the configured service node topology information may include geographic locations of service nodes in the wireless communication system, interrelationships of the service nodes in orientation, etc.

In S802, in a case where the second communication node determines that the second communication node is working in a non-connected state, the second communication node determines a relative position of the second communication node in a service node network according to the service node topology information and a current positioning of the second communication node.

For example, after the second communication node finishes transmitting the service data, i.e., the second communication node is in the non-connected state, the second communication node may determine a relative position between itself and the service nodes in the network according to the service node topology information in combination with the current positioning of itself in the network.

In S803, the second communication node determines a detection mode of synchronization signals according to the relative position.

After obtaining its own relative position, the second communication node may predict the possibility of moving out of the network according to its own speed; so as to determine a subsequent detection mode of the synchronization signals.

For example, if the second communication node has a low possibility of moving out of the network, it is possible to reduce an application for stopping detecting the synchronous signals; conversely, if the second communication node has a high possibility of moving out of the network, it is possible to detect the received synchronization signals and prepare to initiate the random access to request an update to the service node topology information.

In an example; if the second communication node has detected that a received quality (e.g., reference signal received power (RSRP) or reference signal received quality (RSRQ)) of a synchronization signal is greater than a received quality of synchronization signals configured in the service node topology information, the second communication node may initiate the random access; in a case where the number of synchronization signals satisfying the above received quality determination condition (i.e., the received quality of the synchronization signal is greater than the received quality of the synchronization signals configured in the service node topology information) is greater than a certain number. In this way, it is possible to further reduce the power consumption of the second communication node.

In the cell-free network; a plurality of sites usually serve one second communication node at the same time due to the dense deployment of sites, and thus a single access point does not have much influence on the performance of the second communication node.

The embodiments of the present disclosure provide the signal transmission method. The second communication node obtains the service node topology information configured by the first communication node. In the case where the second communication node determines that the second communication node is working in the non-connection state, the second communication node determines the relative position of the second communication node in the service node network according to the service node topology information and the current positioning of the second communication node, and determines the detection mode of the synchronization signal according to the relative position. In this way, the power consumption of the second communication node may be effectively reduced by determining the detection mode of the synchronization signal according to an actual situation thereof.

Figure 9:
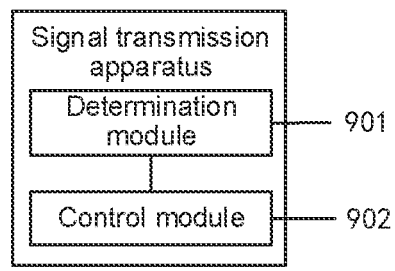
FIG. 9 is a schematic diagram showing a structure of a signal transmission apparatus, in accordance with embodiments of the present disclosure.

FIG. 9 illustrates a signal transmission apparatus, in accordance with embodiments of the present disclosure. As shown in FIG. 9, the apparatus may include a determination module 901 and a control module 902. The determination module 901 is used to determine a plurality of access points within a coverage area. The control module 902 is used to control the plurality of access points to send a plurality of synchronization signals and a plurality of master information blocks (MIBs). The plurality of synchronization signals constitute one or more synchronization signal groups, each synchronization signal corresponds to a synchronization signal index, the synchronization signal index corresponds to a synchronization signal group index and a MIB associated with the synchronization signal group index.

In an example, in a case where at least two synchronization signal group indexes corresponding to at least two synchronization signals are the same, scrambling codes, for scrambling associated MIBs, corresponding to the at least two synchronization signal group indexes are the same. In a case where the at least two synchronization signals have a same sending time, the MIBs associated with the synchronization signal group indexes corresponding to the at least two synchronization signals carry same information.

In an example, in a case where synchronization signal group indexes corresponding to at least two synchronization signals are the same, the at least two synchronization signals satisfy a first quasi co-location (QCL) relationship by default. The first QCL relationship is a relationship where transmission channels of the at least two synchronization signals are the same in at least one of a Doppler shift parameter, a Doppler spread parameter, an average delay parameter, a delay spread parameter and a spatial reception parameter.

The signal transmission apparatus provided in the embodiments is used to implement the signal transmission method in the embodiments shown in FIG. 1, and the implementation principle and technical effect of the signal transmission apparatus are similar to that of the signal transmission method, which will not be repeated herein.

Figure 10:
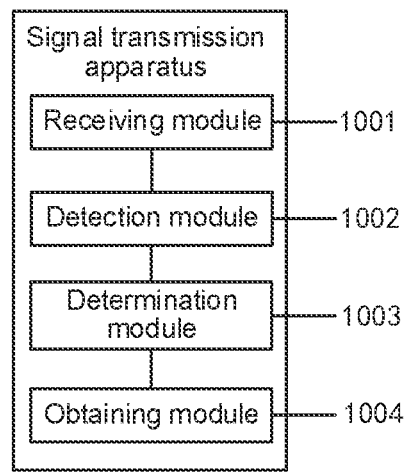
FIG. 10 is a schematic diagram showing a structure of a signal transmission apparatus, in accordance with embodiments of the present disclosure.

FIG. 10 illustrates a signal transmission apparatus, in accordance with embodiments of the present disclosure. As shown in FIG. 10, the apparatus may include a receiving module 1001, a detection module 1002, a determination module 1003 and an obtaining module 1004. The receiving module 1001 is used to receive a plurality of synchronization signals and a plurality of master information blocks (MIBs). The plurality of synchronization signals constitute one or more synchronization signal groups. The detection module 1002 is used to detect the plurality of synchronization signals and the plurality of MIBs. The determination module 1003 is used to determine a synchronization signal group to be accessed according to a detection result. The obtaining module 1004 is used to obtain a MIB associated with a synchronization signal group index of the synchronization signal group to be accessed.

Each of the plurality of synchronization signals corresponds to a synchronization signal index, and the synchronization signal index corresponds to a synchronization signal group index and a MIB associated with the synchronization signal group index.

In an example, in a case where at least two synchronization signal group indexes corresponding to at least two synchronization signals are the same, scrambling codes, for scrambling associated MIBs, corresponding to the at least two synchronization signal group indexes are the same. In a case where the at least two synchronization signals have a same sending time, the MIBs associated with the synchronization signal group indexes corresponding to the at least two synchronization signals carry same information.

In an example, in a case where synchronization signal group indexes corresponding to at least two synchronization signals are the same, the at least two synchronization signals satisfy a first quasi co-location (QCL) relationship by default. The first QCL relationship is a relationship where transmission channels of the at least two synchronization signals are the same in at least one of a Doppler shift parameter, a Doppler spread parameter, an average delay parameter, a delay spread parameter and a spatial reception parameter.

The signal transmission apparatus provided in the embodiments is used to implement the signal transmission method in the embodiments shown in FIG. 2, and the implementation principle and technical effect of the signal transmission apparatus are similar to that of the signal transmission method, which will not be repeated herein.

Figure 11:
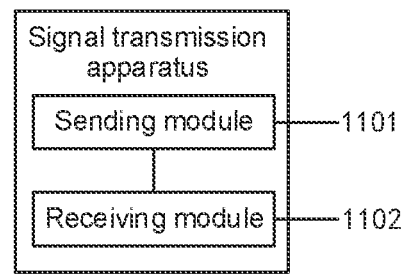
FIG. 11 is a schematic diagram showing a structure of a signal transmission apparatus, in accordance with embodiments of the present disclosure.

FIG. 11 illustrates a signal transmission apparatus, in accordance with embodiments of the present disclosure. As shown in FIG. 11, the apparatus may include a sending module 1101 and a receiving module 1102. The sending module 1101 is used to send system information. The system information includes configuration information of at least one physical random access channel (PRACH), and a PRACH is associated with one or more synchronization signal groups, and the synchronization signal group includes a plurality of synchronization signals. The receiving module 1102 is used to receive a random access preamble sent by a second communication node according to the system information. The sending module 1101 is further used to send a response message for the random access preamble in a preset time window.

In an example, a physical downlink control channel (PDCCH) indicating the response message, a demodulation reference signal corresponding to the PDCCH, and synchronization signals in a synchronization signal group associated with the PRACH satisfy a second quasi co-location (QCL) relationship.

The second QCL relationship may be a relationship where a transmission channel for transmitting the POOCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

The signal transmission apparatus provided in the embodiments is used to implement the signal transmission method in the embodiments shown in FIG. 3, and the implementation principle and technical effect of the signal transmission apparatus are similar to that of the signal transmission method, which will not be repeated herein.

Figure 12:
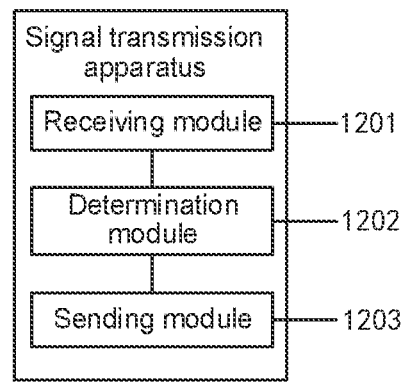
FIG. 12 is a schematic diagram showing a structure of a signal transmission apparatus, in accordance with embodiments of the present disclosure.

FIG. 12 illustrates a signal transmission apparatus, in accordance with embodiments of the present disclosure. As shown in FIG. 12, the apparatus may include a receiving module 1201, a determination module 1202 and a sending module 1203. The receiving module 1201 is used to receive system information, where the system information includes configuration information of at least one physical random access channel (PRACH), and a PRACH is associated with one or more synchronization signal groups. The determination module 1202 is used to determine a target PRACH in the at least one PRACH according to signal parameters of synchronization signals in a synchronization signal group. The sending module 1203 is used to send a random access preamble in the target PRACH.

In an example, the receiving module 1201 is further used to receive a response message sent by the first communication node for the random access preamble in a preset time window. A physical downlink control channel (PDCCH) indicating the response message, a demodulation reference signal corresponding to the PDCCH, and synchronization signals in a synchronization signal group associated with the PRACH satisfy a second quasi co-location (QCL) relationship. The second QCL relationship is a relationship where a transmission channel for transmitting the PDCCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

The signal transmission apparatus provided in the embodiments is used to implement the signal transmission method in the embodiments shown in FIG. 4, and the implementation principle and technical effect of the signal transmission apparatus are similar to that of the signal transmission method, which will not be repeated herein.

Figure 13:
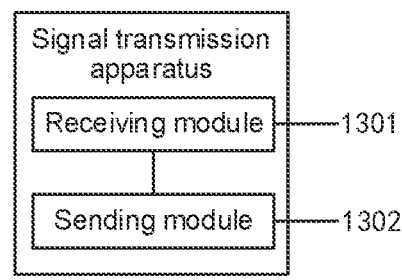
FIG. 13 is a schematic diagram showing a structure of a signal transmission apparatus; in accordance with embodiments of the present disclosure.

FIG. 13 illustrates a signal transmission apparatus, in accordance with embodiments of the present disclosure. As shown in FIG. 13, the apparatus may include a receiving module 1301 and a sending module 1302. The receiving module 1301 is used to send a first random access response message in a preset time window after receiving a random access preamble sent by the second communication node in a pre-configured physical random access channel (MACH). The sending module 1302 is used to send a second random access response message according to the first random access response message. The first random access response message carries a third quasi co-location (QCL) relationship of the second random access response message.

In an example, the third QCL relationship of the second random access response message includes: a QCL relationship between the second random access response message and a demodulation reference signal corresponding to the second random access response message; and/or a QCL relationship between a physical downlink control channel (PDCCH) corresponding to the second random access response message and a demodulation reference signal corresponding to the PDCCH.

In an example, the third QCL relationship is: a relationship where a transmission channel for transmitting the second random access response message and the demodulation reference signal corresponding to the second random access response message and a transmission channel of a synchronization signal initially selected by the second communication node are the same in at least one of a Doppler shift parameter, a Doppler spread parameter, an average delay parameter, a delay spread parameter and a spatial reception parameter; and/or a relationship where a transmission channel for transmitting the POOCH corresponding to the second random access response message and the demodulation reference signal corresponding to the PDCCH and the transmission channel of the synchronization signal initially selected by the second communication node are the same in at least one of the Doppler shift parameter, the Doppler spread parameter, the average delay parameter, the delay spread parameter and the spatial reception parameter.

The signal transmission apparatus provided in the embodiments is used to implement the signal transmission method in the embodiments shown in FIG. 5, and the implementation principle and technical effect of the signal transmission apparatus are similar to that of the signal transmission method, which will not be repeated herein.

Figure 14:
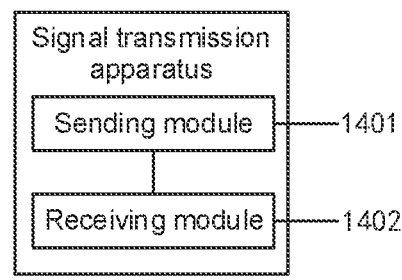
FIG. 14 is a schematic diagram showing a structure of a signal transmission apparatus, in accordance with embodiments of the present disclosure.

FIG. 14 illustrates a signal transmission apparatus, in accordance with embodiments of the present disclosure. As shown in FIG. 14, the apparatus may include a sending module 1401 and a receiving module 1402. The sending module 1401 is used to send a random access preamble in a pre-configured physical random access channel (PRACH). The receiving module 1402 is used to receive a first random access response message sent by a first communication node for the random access preamble in a preset time window. The first random access response message carries a third quasi co-location (QCL) relationship of a second random access response message. The receiving module 1402 is further used to receive the second random access response message according to the first random access response message.

In an example, the third QCL relationship of the second random access response message includes: a QCL relationship between the second random access response message and a demodulation reference signal corresponding to the second random access response message; and/or a QCL relationship between a physical downlink control channel (PDCCH) corresponding to the second random access response message and a demodulation reference signal corresponding to the PDCCH.

In an example, the third QCL relationship is: a relationship where a transmission channel for transmitting the second random access response message and the demodulation reference signal corresponding to the second random access response message and a transmission channel of a synchronization signal initially selected by the second communication node are the same in at least one of a Doppler shift parameter, a Doppler spread parameter, an average delay parameter, a delay spread parameter and a spatial reception parameter; and/or a relationship where a transmission channel for transmitting the PDCCH corresponding to the second random access response message and the demodulation reference signal corresponding to the PDCCH and the transmission channel of the synchronization signal initially selected by the second communication node are the same in at least one of the Doppler shift parameter, the Doppler spread parameter, the average delay parameter, the delay spread parameter and the spatial reception parameter.

The signal transmission apparatus provided in the embodiments is used to implement the signal transmission method in the embodiments shown in FIG. 6, and the implementation principle and technical effect of the signal transmission apparatus are similar to that of the signal transmission method, which will not be repeated herein.

Figure 15:
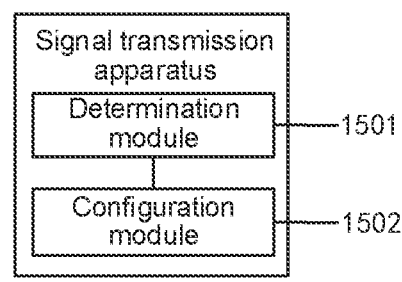
FIG. 15 is a schematic diagram showing a structure of a signal transmission apparatus; in accordance with embodiments of the present disclosure.

FIG. 15 illustrates a signal transmission apparatus, in accordance with embodiments of the present disclosure. As shown in FIG. 15, the apparatus may include a determination module 1501 and a configuration module 1502. The determination module 1501 is used to determine a working state of a second communication node. The configuration module 1502 is used to configure service node topology information for the second communication node, in a case where the working state of the second communication node is a connected state.

The service node topology information includes geographic locations of service nodes and interrelationships of the service nodes in orientation.

The signal transmission apparatus provided in the embodiments is used to implement the signal transmission method in the embodiments shown in FIG. 7, and the implementation principle and technical effect of the signal transmission apparatus are similar to that of the signal transmission method, which will not be repeated herein.

Figure 16:
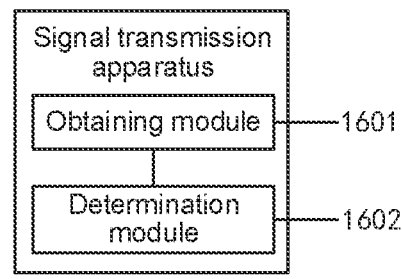
FIG. 16 is a schematic diagram showing a structure of a signal transmission apparatus, in accordance with embodiments of the present disclosure.

FIG. 16 illustrates a signal transmission apparatus, in accordance with embodiments of the present disclosure. As shown in FIG. 16, the apparatus may include an obtaining module 1601 and a determination module 1602. The obtaining module 1601 is used to obtain service node topology information configured by a first communication node. The determination module 1602 is used to determine a relative position of the apparatus in service node network according to the service node topology information and a current positioning of the apparatus, in a case where the apparatus is working in a non-connected state. The determination module 1602 is further used to determine a detection mode of the synchronization signal according to the relative position.

The service node topology information includes geographic locations of service nodes and interrelationships of the service nodes in orientation.

The signal transmission apparatus provided in the embodiments is used to implement the signal transmission method in the embodiments shown in FIG. 8, and the implementation principle and technical effect of the signal transmission apparatus are similar to that of the signal transmission method, which will not be repeated herein.

Figure 17:
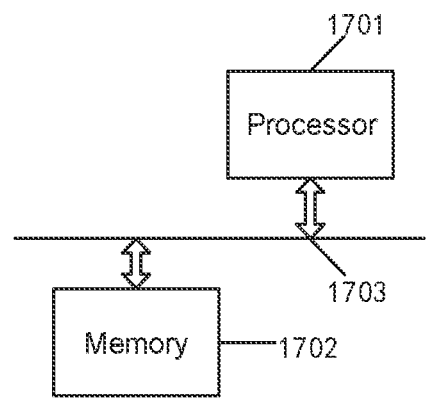
FIG. 17 is a schematic diagram showing a structure of a communication node, in accordance with embodiments of the present disclosure.

FIG. 17 is a schematic diagram showing a structure of a communication node, in accordance with an embodiment of the present disclosure. As shown in FIG. 17, the communication node includes a processor 1701 and a memory 1702. The number of processors 1701 in the communication node may be one or more, and FIG. 17 is described by taking an example in which the communication node includes one processor 1701. The processor 1701 and the memory 1702 in the communication node may be connected by a data bus or in other manners, and FIG. 17 is described by taking an example in which the processor 1701 and the memory 1702 in the communication node are connected by the data bus 1703.

As a computer-readable storage medium, the memory 1702 may be used to store software programs, computer executable programs and modules, such as program instructions or modules corresponding to the signal transmission methods in the embodiments of FIGS. 1, 3, 5 and 7 in the present disclosure. The processor 1701 implements the signal transmission methods by executing the software programs, instructions and modules stored on the memory 1702.

The memory 1702 may mainly include a program storage area and a data storage area. The program storage area may store an operating system, an application program required for at least one function. The storage data area may store data created according to use of a set-top box. In addition, the memory 1702 may include a high-speed random access memory, and may also include a non-volatile memory, such as at least one magnetic disk storage device, flash memory device, or other non-volatile solid state storage devices.

Figure 18:
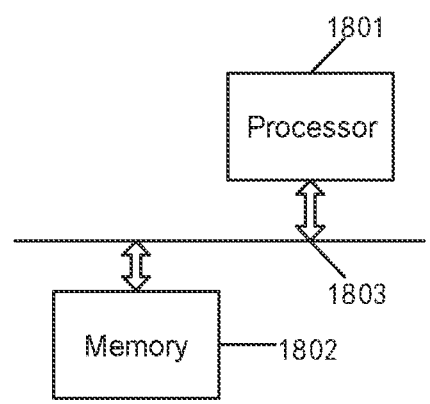
FIG. 18 is a schematic diagram showing a structure of a communication node, in accordance with embodiments of the present disclosure.

FIG. 18 is a schematic diagram showing a structure of a communication node, in accordance with an embodiment of the present disclosure. As shown in FIG. 18, the communication node includes a processor 1801 and a memory 1802. The number of processors 1801 in the communication node may be one or more, and FIG. 18 is described by taking an example in which the communication node includes one processor 1801. The processor 1801 and the memory 1802 in the communication node may be connected by a data bus or in other manners, and FIG. 18 is described by taking an example in which the processor 1801 and the memory 1802 in the communication node are connected by the data bus 1803.

As a computer-readable storage medium, the memory 1802 may be used to store software programs, computer executable programs and modules, such as program instructions or modules corresponding to the signal transmission methods in the embodiments of FIGS. 2, 4, 6, and 8 in the present disclosure. The processor 1801 implements the signal transmission methods by executing the software programs, instructions and modules stored on the memory 1802.

The memory 1802 may mainly include a program storage area and a data storage area. The program storage area may store an operating system, an application program required for at least one function. The storage data area may store data created according to use of a set-top box. In addition, the memory 1802 may include a high-speed random access memory, and may also include a non-volatile memory, such as at least one magnetic disk storage device, flash memory device, or other non-volatile solid state storage devices.

Embodiments of the present disclosure provide a readable and writable storage medium for computer storage. The storage medium stores one or more programs that can be executed by one or more processors to perform the signal transmission methods in the embodiments of FIGS. 1, 3, 5 and 7.

Embodiments of the present disclosure provide a readable and writable storage medium for computer storage. The storage medium stores one or more programs that can be executed by one or more processors to perform the signal transmission methods in the embodiments of FIGS. 2, 4, 6 and 8.

All or some of the steps in the methods disclosed above, and the functional modules or units in the communication nodes disclosed above may be implemented as software, firmware, hardware, and suitable combinations thereof.

In a hardware implementation, the classification between functional modules or units described above does not necessarily correspond to the classification of physical components. For example, one physical component may have a plurality of functions, or one function or step may be performed by a plurality of physical components in cooperation. Some or all of the physical components may be implemented as software executed by a processor, such as a central processor, a digital signal processor or a microprocessor, or as hardware, or as an integrated circuit, such as an application specific integrated circuit. Such softwares may be distributed in computer-readable media, which may include a computer storage medium (or a non-transitory medium) and a communication medium (or a transitory medium). The computer storage media includes volatile and non-volatile media, removable and non-removable media, which are implemented in any method or technology for storing information (e.g., computer-readable instructions, data structures, program modules or other data). The computer storage media include, but are not limited to, a random access memory (RAM), a read-only memory (ROM), an electrically erasable programmable read-only memory (EEPROM), a flash memory or other memory technologies, a compact disk read-only memory (CD-ROM), a digital video disk (DVD) or other optical disk storage, magnetic cassettes, magnetic tapes, magnetic disk storage or other magnetic storage devices, or any other medium which may be used to store the desired information and may be accessed by a computer. In addition, the communication medium typically includes computer-readable instructions, data structures, program modules or other data in a modulated data signal such as a carrier wave or other transmission mechanisms, and the communication medium may include any information delivery medium.

What is claimed is:

1. A signal transmission method, comprising:
   sending, by a first communication node, system information, wherein the system information includes configuration information of at least one physical random access channel (PRACH), a PRACH is associated with at least one synchronization signal group, and the synchronization signal group includes a plurality of synchronization signals; and each synchronization signal corresponds to a synchronization signal index, and the synchronization signal index corresponds to a synchronization signal group index and a master information block (MIB) associated with the synchronization signal group index;
   receiving, by the first communication node, a random access preamble sent by a second communication node according to the system information; and
   sending, by the first communication node, a response message for the random access preamble in a preset time window.

2. The method according to claim 1, wherein a physical downlink control channel (PDCCH) indicating the response message, a demodulation reference signal corresponding to the PDCCH, and the synchronization signals in the synchronization signal group associated with the PRACH satisfy a second quasi co-location (QCL) relationship; and
   the second QCL relationship is a relationship where a transmission channel for transmitting the PDCCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

3. A communication node, comprising: a memory, a processor, a program stored on the memory and executable in the processor, and a data bus provided for achieving connection and communication between the processor and the memory, wherein the program, when executed by the processor, implements the signal transmission method according to claim 1.

4. A non-transitory readable and writable storage medium provided for computer storage, wherein the storage medium has stored thereon at least one program, and the at least one program is executable by at least one processor to implement the signal transmission method according to claim 1.

5. A signal transmission method, comprising:
   receiving, by a second communication node, system information, wherein the system information includes configuration information of at least one physical random access channel (PRACH), a PRACH is associated with at least one synchronization signal group, and the synchronization signal group includes a plurality of synchronization signals; and each synchronization signal corresponds to a synchronization signal index, and the synchronization signal index corresponds to a synchronization signal group index and a master information block (MIB) associated with the synchronization signal group index;
   determining, by the second communication node, a target PRACH in the at least one PRACH according to signal parameters of synchronization signals in a received synchronization signal group; and
   sending, by the second communication node, a random access preamble in the target PRACH.

6. The method according to claim 5, wherein after the second communication node sending the random access preamble in the target PRACH, the method further comprises:
   receiving, by the second communication node, a response message sent by a first communication node for the random access preamble in a preset time window, wherein
   a physical downlink control channel (PDCCH) indicating the response message, a demodulation reference signal corresponding to the PDCCH, and synchronization signals in the synchronization signal group associated with the PRACH satisfy a second quasi-co-location (QCL) relationship; and
   the second QCL relationship is a relationship where a transmission channel for transmitting the PDCCH and the demodulation reference signal has an association relationship with transmission channels of the synchronization signals in the synchronization signal group associated with the PRACH in at least one of a Doppler shift parameter, a Doppler spread parameter, an average delay parameter, a delay spread parameter and a spatial reception parameter.

7. A communication node, comprising: a memory, a processor, a program stored on the memory and executable in the processor, and a data bus provided for achieving connection and communication between the processor and the memory, wherein the program, when executed by the processor, implements the signal transmission method according to claim 5.

8. A non-transitory readable and writable storage medium provided for computer storage, wherein the storage medium has stored thereon at least one program, and the at least one program is executable by at least one processor to implement the signal transmission method according to claim 5.

9. A signal transmission method, comprising:
   sending, by a second communication node, a random access preamble in a pre-configured physical random access channel (PRACH), wherein the random access preamble is sent by the second communication node according to system information from a first communication node, the system information includes configuration information of at least one physical random access channel (PRACH), a PRACH is associated with at least one synchronization signal group, and the synchronization signal group includes a plurality of synchronization signals; and each synchronization signal corresponds to a synchronization signal index, and the synchronization signal index corresponds to a synchronization signal group index and a master information block (MIB) associated with the synchronization signal group index;

receiving, by the second communication node, a first random access response message sent by a first communication node for the random access preamble in a preset time window, wherein the first random access response message carries a third quasi-co-location (QCL) relationship of a second random access response message; and receiving, by the second communication node, the second random access response message according to the first random access response message.

10. The method according to claim 9, wherein the third QCL relationship of the second random access response message includes at least one of:

a QCL relationship between the second random access response message and a demodulation reference signal corresponding to the second random access response message, and a QCL relationship between a physical downlink control channel (PDCCH) corresponding to the second random access response message and the demodulation reference signal corresponding to the PDCCH.

11. The method according to claim 9, wherein the third QCL relationship includes at least one of the following: a relationship where a transmission channel for transmitting the second random access response message and a demodulation reference signal corresponding to the second random access response message and a transmission channel of a synchronization signal initially selected by the second communication node are same in at least one of a Doppler shift parameter, a Doppler spread parameter, an average delay parameter, a delay spread parameter and a spatial reception parameter, and a relationship where a transmission channel for transmitting a physical downlink control channel (PDCCH) corresponding to the second random access response message and a demodulation reference signal corresponding to the PDCCH and the transmission channel of the synchronization signal initially selected by the second communication node are same in at least one of the Doppler shift parameter, the Doppler spread parameter, the average delay parameter, the delay spread parameter and the spatial reception parameter.

12. A communication node, comprising: a memory, a processor, a program stored on the memory and executable in the processor, and a data bus provided for achieving connection and communication between the processor and the memory, wherein the program, when executed by the processor, implements the signal transmission method according to claim 9.

13. A non-transitory readable and writable storage medium provided for computer storage, wherein the storage medium has stored thereon at least one program, and the at least one program is executable by at least one processor to implement the signal transmission method according to claim 9.

* * * * *